United States Patent Office 3,470,809
Patented Oct. 7, 1969

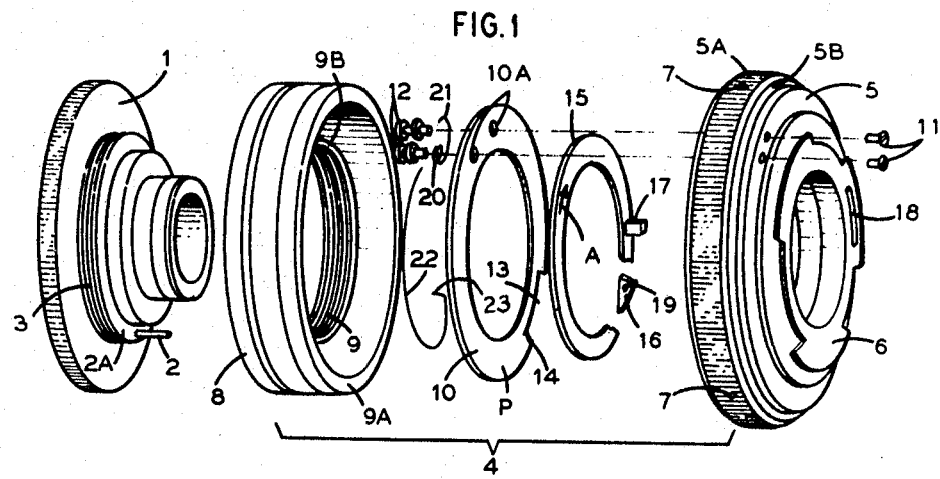
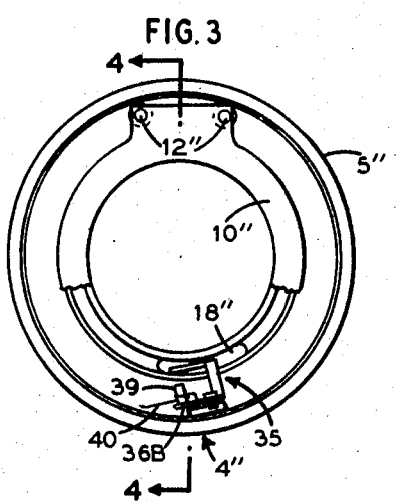
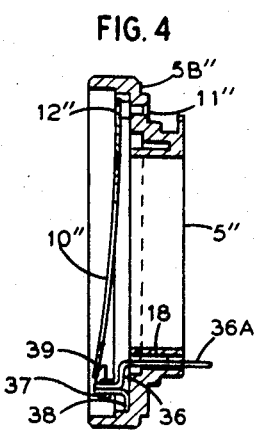
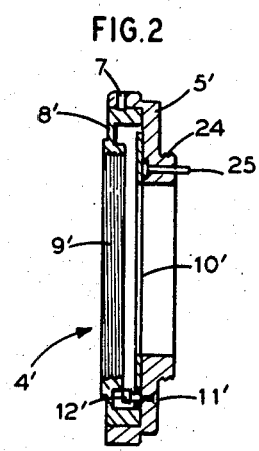

3,470,809
ADAPTOR FOR INTERCHANGEABLE LENS WITH AUTOMATIC DIAPHRAGM MECHANISM
Ryo Uchida, Tokyo, Japan, assignor to Sigma Research, Incorporated, Tokyo, Japan, a corporation of Japan
Filed Sept. 7, 1967, Ser. No. 666,079
Claims priority, application Japan, Sept. 8, 1966, 41/84,133
Int. Cl. G03b 9/02
U.S. Cl. 95—64        8 Claims

ABSTRACT OF THE DISCLOSURE

An adaptor for use on cameras adapted to be equipped with interchangeable lens that includes an automatic diaphragm having a protrusion for activating the diaphragm. Essentially the adaptor comprises a main body by which it is attached to the camera and to which an orientation ring is secured for receiving the interchangeable lens. Between the body of the adaptor and the orientation ring there are provided means which proportionally transmit the movement of the shutter mechanism of the camera to the automatic diaphragm of the lens.

---

This invention relates generally to an improved adaptor for use on cameras having interchangeable lens with automatic diaphragm mechanisms; and more specifically to adaptors intended to be used with interchangeable lens-type single lens reflex cameras of 35 mm. size or cinema size.

In recent years there has been an increasing tendency to manufacture the T-type lens, the one kind of lens that combines varied single lens reflex camera, Leika-type camera and 16 mm. camera (42, p equals 0.77 mm., f.f.d. equals 55 mm.) as they are convenient to use, and also because it enables both sellers and manufacturers to significantly reduce their inventory.

It was heretofore possible to use such interchangeable lens with various types of cameras by simply changing relatively inexpensive adaptors. However to use such adaptors, as they were, with interchangeable lens with automatic diaphragm mechanisms, presented certain serious problems. This was because one cannot be always certain that the mechanism will function as the precision of movements is not always assured. Moreover, the automatic diaphragm mechanism, the field of movement and the momentum of each camera varied from camera to camera.

It has been noted that interchangeable lens with automatic diaphragm mechanisms can be classified generally into two classes, namely (a) those types of cameras whose shutters and protrusions associated therewith move toward the direction of the light ray, such as the Asahi Pentax, Yashica and Practica type of cameras and the like; and (b) those types of cameras whose shutters and protrusions connected therewith move with an angular or circulatory movement such as the Minolta, Canon, Leika F and the like.

Accordingly, in view of the foregoing observations, the difficulties heretofore encountered have been overcome by developing an a-type automatic diaphragm mechanism built into the main body of the lens and an adaptor in which the protrusion extending from the main body of the lens comes into contact with a middle ring mounted within the adoptor and which middle ring is made to change the direction of movement to the direction of light so as to be coordinated with the mechanism connected with the shutter mechanism of the camera.

In the drawings:

FIG. 1 is an exploded perspective view of the component parts of one form of the invention.

FIG. 2 is a vertical sectional view of a modified form of the invention.

FIG. 3 is a fragmentary front view of an adaptor body of a modified construction.

FIG. 4 is a sectional view taken along line 4—4 on FIG. 3.

Referring to the drawings, there is shown in FIG. 1 an adaptor 4 for use with interchangeable lens with automatic diaphragm mechanism 1 by which the latter may be attached to b-type cameras (not shown). The interchangeable lens 1 has a T-mount with built-in automatic diaphragm of known construction in which the pin or protrusion 2, which changes the direction of movement to the direction of light ray extends outwardly through the face 2A of the lens 1. A screw 3 is formed on the periphery of a projecting mount of the lens 1.

The adaptor for attaching the lens 1 to the camera is illustrated at 4. As the adaptor 4 is intended for use with B-type cameras, bayonet means 6 are connected to the main body portion 5. As shown, the main body 5 is provided with a circumscribing flange 5A which is sized to snugly receive the orientation ring 8. The orientation ring 8 is arranged to be fitted into the main body 5 of the adaptor 4 and is secured in place therein by a plurality of set screws 7 which project radially through tapped holes circumferentially spaced about the flange 5A of the main body to engage ring 8 in the assembled position. The arrangement is such that in the assembled position the edge 9A of ring 8 engages the inside surface of the face portion 5B of the main body 5. Concentrically disposed within the orientation ring 8 and connected thereto by a circumscribing web 9B is a threaded inner flange 9 which is arranged to mate or screw with the screw threads 3 when assembled.

Interposed in a space defined between the face of the adaptor 4 and the inner flange 9B is a middle ring 10. As shown the middle ring 10 is provided with a pair of holes 10A by which it is secured by a pair of anchor pins 12, 12 which are fixed to the face of the main body 5 by suitable fasteners or screws 11, 11. As one end of the middle ring 10 is secured, the other end is free to flex or move relative to its anchored end. A portion of the ring 10 substantially opposing the anchor points thereof is formed with a cut-out portion 13, the end of which tapers or slopes radially inwardly as shown at 14.

A second or movable ring 13 is positioned in a space between the middle ring 10 and the inside face of the main body 5 so as to move freely therein. As shown the movable ring 15 has a connected projection 17 which is adapted to engage a cam 16 that moves the middle ring 10 in response to the movement of the shutter mechanism of the camera. The projection 17 is made sufficiently long so as to extend through an aligned slot 18 formed in the main body 5 of the adaptor 4.

The cam 16 is provided with a hole 19 for receiving one end 23 of a spring 22. The other end of the spring 22 is provided with a coiled portion 20 which coils about one of the anchor pins 12 and having the free end 21 secured on bias against the other anchor pin 12. The arrangement of the spring 22 is such that it normally biases the movable ring 15 in the direction of the arrow A.

With the construction described it will be noted that when the interchangeable lens 1 and combined adaptor 4 is threaded thereby by engagement of threads 3 and 9, the movable ring 15 is made to resist the force of spring 22 and to move in the direction opposite to the direction of the arrow A by projection 17; and the cam 16 moves to the cut-out portion 13 of the ring 10. Thus, the middle ring 10 maintains a space between the camera which enables the blades of the diaphragm of the interchangeable lens to completely open.

When the button of the shutter is pressed, that portion of the camera which is connected with projection 17 moves so that the movable ring 15, influenced by spring 22, is caused to move in the direction of arrow A thereby placing the cam 16 in motion to displace the middle ring 10. The middle ring 10 in displacing presses the protrusion 2, which in turn moves the blades of the diaphragm to open position as they should.

FIG. 2 illustrates a modified form of adaptor 4' for use when the T-mount interchangeable lens 1, hereinbefore described, is to be attached to *a*-type cameras. In this form the main body 5' of the adaptor 4' is provided with a threaded portion 24 having the same thread as that of the mount of screw 3. In lieu of the moveable ring 15 of FIG. 1, the form of FIG. 2 utilizes a moveable bar 25 which is mounted to move freely in the direction of the light rays. The middle ring 10' in this embodiment is mounted or attached to move freely relative to the anchor pins and fasteners 12' and 11', which secure one end of ring 10' to the body of the adaptor 5'. As it is evident from the drawing of FIG. 2, the movement of the camera is transmitted by the movable bar 25 to the middle ring 10', and the displacement of the latter presses the protrusion 2 of the interchangeable lens 1 connected thereto as hereinbefore described. In all other respects the construction of adaptor 4' is similar to that hereinbefore described with respect to FIG. 1.

In the embodiment of FIG. 2, the mount 3 of the interchangeable lens 1 is the T-mount which can be readily threaded to the threads 9 or 9' of the orientation ring 8 as previously described. The terminal portion of the built-in automatic diaphragm mechanism comprises the protrusion 2 which moves in the direction of the light rays. When the adaptor 4 or 4' is attached to the mount 3, the middle ring 10 or 10' in engagement with the protrusion 2 effects displacement thereof when the middle ring 10, 10' is actuated by the shutter mechanism. The arrangement is such that even if there is some fault in attaching the interchangeable lens 1 to the adaptor, and the adaptor to the camera, the fault can be fully compensated. Moreover the use of the middle ring 10, 10' readily eliminates resistance that would otherwise pose a problem when transmitting movements of the *b*-type camera to the interchangeable lens 1 with automatic diaphragm mechanism, and which has made it possible to adopt the T-mount interchangeable lens as a built-in part of the automatic diaphragm mechanism.

FIGS. 3 and 4 illustrate another embodiment. In this form the adaptor 4" includes a body member 5" similar to that of FIG. 1 with the exception that it is rotated so that the slot 18" is disposed at the bottom. Secured to the face portion 5B" is a middle ring 10". The attachment of the middle ring 10" to the face 5B" of adaptor body 5" is similar to that described with respect to FIG. 2. That is a portion of ring 10" is secured by anchor pins 12" and associated fasteners 11". The other end of the middle ring 10" is free to flex as hereinbefore described.

The actuating means 35 in this form of the invention comprises a bell crank type lever 36 pivotly mounted about a pivot pin 37 mounted on bracket 38. One end 36A of the bell crank lever 36 is offset to project out through slot 18". The other offset end portion 36B has an upright pin 39 connected thereto for engaging with the middle ring 10". A spring 40 is provided to bias the lever 36 against the middle ring 10". As shown one end of the spring is secured to lever portion 36B as the other end is biased against the face of the adaptor body 5". An intermediate portion of spring 40 is coiled about pin 39. In all other respects the adaptor of FIGS. 3 and 4 is similar to that previously described with FIG. 2. That is the orientation ring is secured to the adaptor body 5" in a manner hereinbefore described.

In this form of the invention the lever portion 36A is arranged to move freely in the direction of the light rays in response to the actuation of the shutter mechanism of the camera. In response to the movement of the shutter mechanism the actuator means 35 effects proportional displacement of the middle ring which in turn effects displacement of the protrusion 2 of the connected lens assembly to control the diaphragm accordingly.

Further it will be noted that the illustrated embodiments are relatively simple in construction, positive in operation, and can be easily made.

Also in the illustrated embodiments the orientation rings of the respective described adaptors 5, 5', and 5" can be adjusted so that each described adaptor can be attached at a zero point, an arrangement and construction that reduces the loss heretofore sustained during manufacture.

While the invention has been illustrated and described with respect to the illustrated embodiments, it will be understood and appreciated that variations and modifications may be made without departing from the spirit or scope of the invention.

What is claimed is:

1. An adaptor for a camera adapted for use with a T-mount interchangeable lens that includes an automatic diaphragm and a protrusion for activating the said diaphragm that moves toward the direction of light ray comprising,
    a main adaptor body having means whereby it may be detachably connected to a camera,
    a middle ring disposed within said adaptor body,
    means for connecting a peripheral portion of said middle ring to said adaptor body whereby said middle ring is free to flex within said adaptor body,
    an actuating means operatively associated with said middle ring to coordinate the movement of said middle ring to the movement of the shutter mechanism of the camera,
    and means connected to said adaptor body for detachably securing the interchangeable camera lens thereto.

2. The invention as defined in claim 1 wherein said latter means includes:
    an orientation ring,
    means for securing the orientation ring to said body,
    and said orientation ring having a threaded inner flange adapted to mate with a complementary threaded portion on said interchangeable lens.

3. The invention as defined in claim 2 wherein:
    said main body includes a face portion having connected bayonet means by which it is attached to the camera, and a circumscribing flange extending laterally of said face portion,
    said face portion having an elongated slot formed therein,
    and said orientation ring being adapted to be received within the flange of said main body portion whereby a space is defined between said orientation ring and the face of said adaptor,
    and said middle ring being disposed in said space between said adaptor body and said orientation ring,
    and said actuating means including a means adapted to extend through the slot in said body to engage with the shutter mechanism of a camera.

4. The invention as defined in claim 3 wherein said actuating means includes:
    a bell crank lever pivotly mounted on the body of said adaptor, said lever having a leg portion extending through said slot and having a second leg portion in engagement with said middle ring,
    and a spring means for biasing said lever.

5. The invention as defined in claim 1 wherein:
    said actuating means includes a movable ring disposed in the space between said body and said orientation ring,
    said middle ring being rotatably movable,
    a projection connected to said movable ring to project through said slot,
    and a spring means for biasing said movable ring.

6. The invention as defined in claim 5 wherein a cam means is operatively interconnected between the movable ring and the middle ring.

7. The invention as defined in claim 1 wherein said actuating means includes a movable bar mounted for axial movement relative to said body, and said bar being disposed in engagement with said middle ring whereby displacement of said bar in response to the movement of the shutter mechanism of the camera effects displacement of said middle ring.

8. In combination with a camera and an interchangeable lens therefor having a T-mount and automatic diaphragm with projecting protrusion that moves toward the direction of light ray for activating the same, the improvement of:

an adaptor for detachably connecting the interchangeable lens to the camera, said adaptor including a body member having a face portion with bayonet means by which the body is attached to a camera, and a circumscribing face extending laterally about said face portion, said face portion having an elongated slot formed therein, an orientation ring adapted to be received within the flange of said body member, screw fasteners for securing said orientation ring within the flange of said body wherein a space is defined between said face portion and said orientation ring, said orientation ring having an internally threaded flange adapted to mate with the threads of a lens mount, a middle ring disposed in said space, means for securing a peripheral portion of said middle ring to said face portion whereby said middle ring is free to flex relative to said body to effect displacement of the protrusion of said lens to operate the diaphragm accordingly, and actuating means for effecting displacement of said middle ring, said actuating means including a lever means projecting through said opening to engage with the shutter mechanism of said camera.

References Cited

UNITED STATES PATENTS

| | | | |
|---|---|---|---|
| 2,830,513 | 4/1958 | Sauer | 95—64 |
| 3,082,672 | 3/1963 | Swarofsky et al. | 95—64 XR |
| 3,352,220 | 11/1967 | Lang et al. | 95—64 XR |
| 3,375,768 | 4/1968 | Klupsch | 95—64 XR |

FOREIGN PATENTS 778,209  7/1957  Great Britain.

NORTON ANSHER, Primary Examiner

JOSEPH F. PETERS, JR., Assistant Examiner